Oct. 22, 1957  V. S. BUCCICONE  2,810,880
APPARATUS FOR DETECTING MAGNETIC OBJECTS OR THE LIKE
Filed March 25, 1954  2 Sheets-Sheet 1
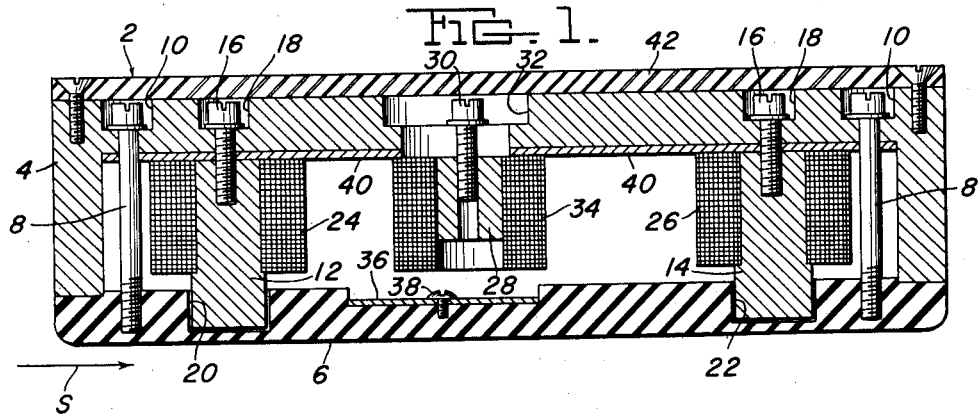
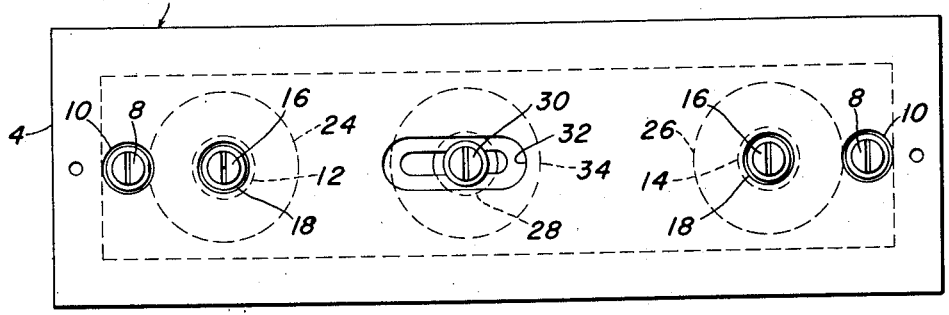
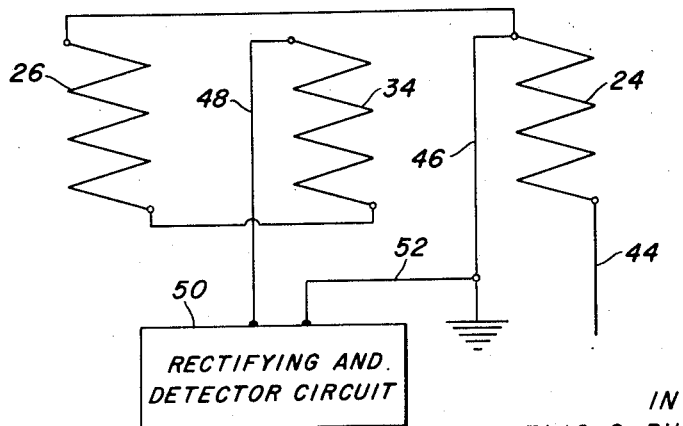
INVENTOR:
VELIO S. BUCCICONE,
BY: Robert U. Geib Jr.
his Attorney.

Oct. 22, 1957 V. S. BUCCICONE 2,810,880
APPARATUS FOR DETECTING MAGNETIC OBJECTS OR THE LIKE
Filed March 25, 1954 2 Sheets-Sheet 2

INVENTOR
VELIO S. BUCCICONE

United States Patent Office 2,810,880
Patented Oct. 22, 1957

2,810,880

APPARATUS FOR DETECTING MAGNETIC OBJECTS OR THE LIKE

Velio S. Buccicone, Gary, Ind.

Application March 25, 1954, Serial No. 418,681

5 Claims. (Cl. 324—34)

This invention relates to apparatus for detecting magnetic objects or the like and is a continuation-in-part of my copending application Serial No. 292,033, filed June 6, 1952, now Patent No. 2,751,150. The invention is particularly directed to a sensitive unit and is an improvement over the sensitive unit of my above mentioned application. While the sensitive unit described in my said application is suitable for most purposes, it does not always function properly when detecting bowed sheets or sheets approaching the detector from odd angles. The effects of fluttering of sheets were also noticeable with my previous unit. If a portion of the sheet was closer to the balance coil core than to the other cores as it passed the detector, the operation of the detector was not perfect. It is also desirable to have the detector compact and to protect it from dirt and stray fields.

It is therefore an object of my invention to provide a compact sensitive unit for use in detecting magnetic objects or the like which is more sensitive than prior units.

This and other objects will be more apparent after referring to the following specification and attached drawings, in which:

Figure 1 is a longitudinal sectional view of one embodiment of my invention;

Figure 2 is a top plan view of the unit of Figure 1 with a part removed;

Figure 3 is a schematic wiring diagram of the electrical circuit of my invention showing the connections to the sensitive unit;

Figure 4:
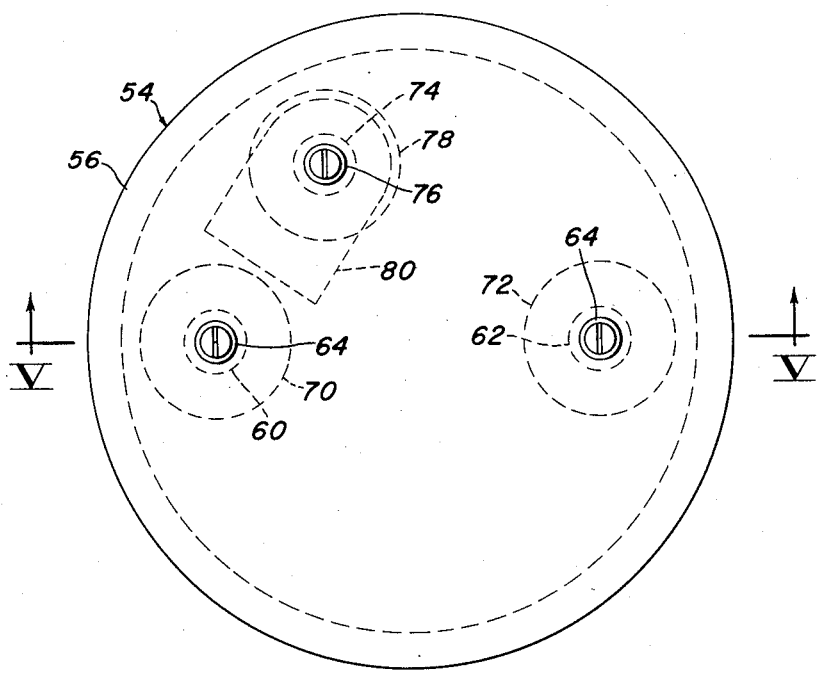
Figure 4 is a top plan view of a second embodiment of my invention.

Referring more particularly to the drawings, the reference numeral 2 indicates the sensitive unit of my invention. The unit 2 includes a case or box 4 made of steel or other magnetic material open at one end, the open end being covered by a plate 6 made of non-magnetic material. The plate 6 is fastened to the box 4 by means of a pair of cap screws 8 which are received in counterbored holes 10 in the base of box 4 and are threaded into the plate 6. The cores 12 and 14 of substantially equal length are fastened to the base of the box 4 by means of cap screws 16 which are threaded into the cores 12 and 14 with their heads being received in counterbored holes 18 in the base. The other ends of the cores 12 and 14 are received in holes 20 and 22 in the plate 6. Substantially identical coils 24 and 26 surround the cores 12 and 14, respectively. A third and shorter core 28 is fastened to the base of the box 4 by means of a cap screw 30 which is threaded into the core 28 with its head being received in an elongated counterbored hole 32. A coil 34 which is preferably of the same size as coils 24 and 26 surrounds the core 28. A steel plate 36 is fastened to the inside of plate 6 by means of a screw 38, the plate 36 extending from the coil 34 substantially to coil 24. A steel plate 40 of high permeability is mounted between the cores and the box 4 to help prevent leakage flux from passing out through the base of the box 4 and to give a more efficient direct magnetic path to all cores. The use of this plate gives the unit greater sensitivity than previously obtained and is important in the most efficient operation of the device. A non-ferrous cover 42, preferably of aluminum, makes the unit dust-proof, acts as a magnetic shield for A. C. fields and does not permit flux to enter through the slotted opening in the box 4. The cover 42 also prevents the A. C. field from coming out of the box.

The coil 24 is continuously energized with 120 volts alternating current through wire 44. The coils 26 and 34 are identical and are placed in the same physical direction so that when the leads of one coil are reversed from the other the terminal voltage of the coils will be of opposite polarity. When the coils 26 and 34 are connected in series and opposite in polarity as shown, the combined output will always be the difference between their outputs. Line 46 from coil 24 is connected to ground and line 48 from coil 34 is connected to a rectifying and detector circuit 50 which may be of the same type as that shown in my above mentioned application. The circuit 50 is connected to ground through lead 52.

The operation of the device is as follows: The position of the balance core 28 is adjusted so that with no sheet S near the poles of the unit 2 the voltage from the terminals of coil 34 is equal to the voltage from the terminals of coil 26. Since these coils are connected in series opposing each other the combined voltage will be zero. When a sheet S is placed near the poles a greater amount of flux will be induced in pick-up coil 26, but the flux induced in coil 34 will remain the same since it is already receiving a heavy flux through plate 36. This is very important since once the circuit 50 is actuated by a sheet it cannot be deactuated if the sheet moves closer to the unit 2 or if the sheet is bowed or bent. When the sheet passes from the unit 2 the circuit 50 will be deactuated in the same manner as described in my above identified application.

Figure 5:
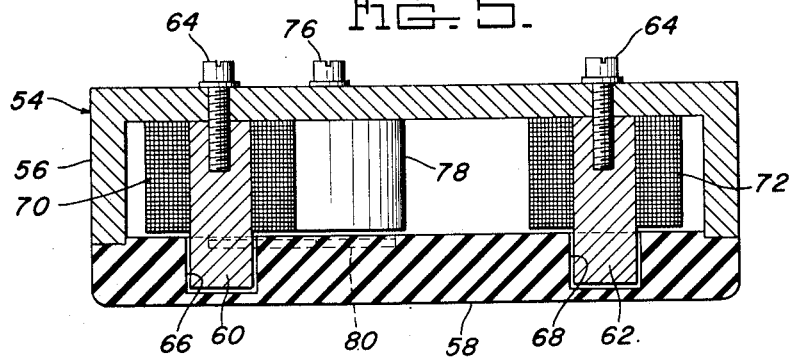
Figure 5 is a sectional view taken on the line V—V of Figure 3.

Referring to Figures 4 and 5 of the drawings, the reference numeral 54 indicates the sensitive unit of another embodiment of my invention. The unit 54 includes a circular case or box 56 made of steel or other magnetic material open at one end, the open end being covered by a plate 58 made of non-magnetic material such as Micarta. Any suitable means may be provided for fastening the plate 58 to the box 56. Two cores 60 and 62 of substantially equal length are fastened to the base of box 56 by means of cap screws 64 threaded into the cores. The other end of the cores 60 and 62 are received in holes 66 and 68 in the plate 58. Substantially identical coils 70 and 72 surround the cores 60 and 62, respectively. A third and shorter core 74 is fastened to the base of the box 56 by means of a cap screw 76 threaded into the core. A coil 78 which is preferably of the same size as coils 70 and 72 surrounds the core 74. It will be noted that the core 74 is in offset relationship with respect to the cores 60 and 62. The heaviest flux flow is between poles 60 and 74 and poles 60 and 62 while only a slight amount of flux flows from pole 74 to pole 62. If desired a steel plate 80, similar to plate 36, may be fastened to the cover 58, the plate 80 extending from the coil 78 substantially to coil 70. The energized coil 70, pick-up coil 72 and balance coil 78 correspond to coils 24, 26 and 34, respectively, and are connected to each other and to the detector circuit in the same manner as coils 24, 26 and 34. The operation of this device is essentially the same as that of Figures 1 to 3.

While two embodiments of my invention have been shown and described it will be apparent that other adapta-

I claim:

1. Apparatus for detecting magnetic objects or the like comprising a box made of magnetic material, a cover for said box made of non-magnetic material, two cores of substantially equal length in said box extending from the base of said box to said cover, identical coils surrounding said cores, a shorter core in said box extending from said base toward said cover, a third coil surrounding said shorter core, said last named core being located in a plane between said first two cores, means connecting one of the first two coils to a source of alternating current, and means connecting the other of the first two coils in series with the third coil.

2. Apparatus for detecting magnetic objects or the like according to claim 1 including a plate of magnetic material located between said cover and the third coil.

3. Apparatus for detecting magnetic objects or the like according to claim 2 including a ferrous metal plate located at the base of said box and extending between said coils.

4. Apparatus for detecting magnetic objects or the like according to claim 3 including a non-ferrous plate fastened to the outside of and substantially covering the bottom of said box.

5. Apparatus for detecting magnetic objects or the like according to claim 1 in which the said box and cover are substantially cylindrical and the third core and coil are offset from the first two coils.

References Cited in the file of this patent

UNITED STATES PATENTS

| | | |
|---|---|---|
| 2,311,715 | Thorne | Feb. 23, 1943 |
| 2,609,530 | Tricebock et al. | Sept. 2, 1952 |